Patented Apr. 3, 1923.

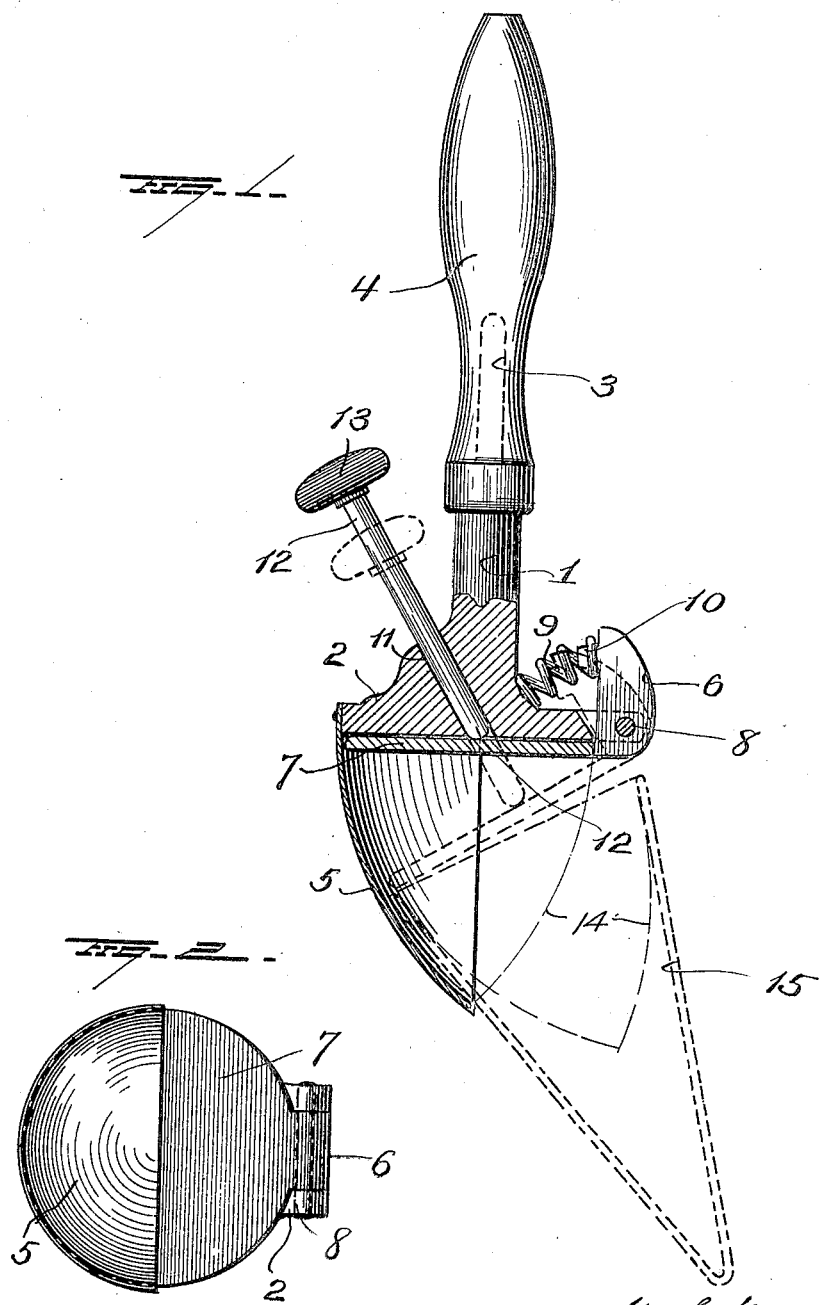

1,450,886

UNITED STATES PATENT OFFICE.

WILLIAM GLOCK HEIMERDINGER, OF LOUISVILLE, KENTUCKY.

ICE-CREAM DIPPER.

Application filed August 10, 1921. Serial No. 491,197.

*To all whom it may concern:*

Be it known that I, WILLIAM G. HEIMERDINGER, a citizen of the United States, and a resident of Louisville, in the county of Jefferson and State of Kentucky, have invented certain new and useful Improvements in Ice-Cream Dippers; and I do hereby declare the following to be a full, clear, and exact description of the invention, such as will enable others skilled in the art to which it appertains to make and use the same.

This invention relates to improvements in ice cream dippers,—one object of the invention being to provide a device of this character, with the use of which ice cream may be formed in the shape of a cone without the employment of two relatively movable molding members, and to so construct the device that the cone of ice cream may be ejected laterally and thus facilitate its deposit into a pastry cone.

With this and other objects in view, the invention consists in certain novel features of construction and combinations of parts as hereinafter set forth and pointed out in the claims.

In the accompanying drawings, Figure 1 is a sectional view illustrating an embodiment of my improvement, and Figure 2 is a bottom plan view.

The body portion 1 of the device is made with a head 2 which may be circular or partly circular in shape, and from the body portion 1 a shank 3 projects for the accommodation of a suitable handle 4.

A cutter 5 preferably of sheet metal and made in the shape of approximately one-half of a hollow cone, is secured at its upper end to the peripheral portion of the head 2,—said cutter constituting in effect the bowl or dipper member of the device. Opposite that portion of the head 2 to which the cutter or bowl member 5 is secured, the head may be notched to receive an arm 6 of an ejector 7, said arm being pivotally supported by the head 2, as indicated at 8. Between the free end of the arm 6 and the body portion 1 of the device, a spring 9 is disposed and receives a stud 10 projecting from said arm. The body portion and its head are made with a diagonal hole 11 through which a diagonally disposed rod or pusher 12 passes so as to engage the ejector 7 and said rod or pusher may be provided at its upper end with a suitable knob or head 13.

The ejector 7 is normally held against the under face of the head 2 of the body 1 by the action of the spring 9 and in operating the device, the cutter or bowl 5 is caused to penetrate the ice cream and when the device is then turned by the user, a cone of ice cream will be formed. The user may now hold the pastry cone in a diagonal position opposite the cutter or bowl 5 and then, by pressing the rod or pusher 11, the ejector will be moved on its pivot 8 and will cause the cone of ice cream indicated at 14 to be ejected laterally and enter a pastry cone 15.

With the use of my improvements, the ice cream may be properly shaped and deposited in a pastry cone when the parts are handled by the user in the most natural manner and the use of relatively movable members to dip and shape the cone of ice cream is avoided.

Having fully described my invention what I claim as new and desire to secure by Letters-Patent, is:

1. An ice cream dipper consisting of a head, a rigid handle extending from one side of the head, a hollow conoidal cutter secured at its basal end upon and extending part way around the edge of the head and projecting from the side of the head opposite the handle, an ejector pivotally mounted on the head to swing toward and from the same over the inner concave face of the cutter, means for holding the ejector normally against the head, and means for moving the ejector from the head to discharge the contents of the cutter.

2. An ice cream dipper comprising a head, a hollow cutter secured rigidly to and projecting from the head, an ejector pivoted upon the head to swing toward and from the same along the inner face of the cutter, yieldable means for holding the ejector against the side of the head at the base of the cutter, and a pusher slidable through the head and bearing upon the ejector to swing the same toward the outer end of the cutter and discharge the contents thereof.

3. An ice cream dipper consisting of a head having a radial notch in its edge, a tapered cutter secured at its basal end upon the edge of the head with its side edges spaced from said notch, an ejector adapted to lie against the head at the base of the cutter and having an arm extending through and pivoted in the notch in the head, an expansion spring disposed between and bearing against the back of the head and the end of said arm, and a pusher slidably mounted in the head and bearing against the ejector.

In testimony whereof, I have signed this specification in the presence of two subscribing witnesses.

WILLIAM GLOCK HEIMERDINGER.

Witnesses:
 ELEANORA GLOCK,
 EDWARD D. WHITE.